(12) United States Patent     (10) Patent No.:   US 12,665,736 B2

Kim     (45) Date of Patent:   Jun. 23, 2026

(54) SINK DEVICE, SOURCE DEVICE, AND CONTROL METHODS FOR SAME

(71) Applicant: SAMSUNG ELECTRONICS CO., LTD., Suwon-si (KR)

(72) Inventor: Hyunseok Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/079,110

(22) Filed: Dec. 12, 2022

(65) Prior Publication Data

US 2023/0107140 A1     Apr. 6, 2023

Related U.S. Application Data

(63) Continuation of application No. PCT/KR2021/003863, filed on Mar. 29, 2021.

(30) Foreign Application Priority Data

Jun. 26, 2020    (KR) ........................ 10-2020-0078778

(51) Int. Cl.
   *H04L 7/027*      (2006.01)
   *H04L 25/03*     (2006.01)
   *H04N 7/01*      (2006.01)

(52) U.S. Cl.
   CPC ........ *H04L 7/027* (2013.01); *H04L 25/03866* (2013.01); *H04N 7/0125* (2013.01)

(58) Field of Classification Search
   CPC ...................................................... H04L 7/027
   USPC ......................................................... 375/364
   See application file for complete search history.

(56) References Cited

U.S. PATENT DOCUMENTS

| | | | |
|---|---|---|---|
| 8,185,669 | B2 | 5/2012 | Oh |
| 8,862,791 | B2 | 10/2014 | Tao et al. |
| 9,800,930 | B2 | 10/2017 | Kim |
| 9,838,226 | B2 | 12/2017 | Whitby-Strevens |
| 9,912,843 | B2 | 3/2018 | Yeh et al. |
| 10,440,425 | B2 | 10/2019 | Kozuka et al. |
| 10,477,141 | B1 * | 11/2019 | Huang ................. H04N 21/435 |
| 10,631,041 | B1 * | 4/2020 | Suzuki ..................... H04N 5/44 |
| 10,862,248 | B2 * | 12/2020 | Tziviskos .......... H01R 13/6585 |
| 11,350,158 | B2 | 5/2022 | Shin et al. |

(Continued)

FOREIGN PATENT DOCUMENTS

| | | |
|---|---|---|
| JP | 2012-249037 A | 12/2012 |
| JP | 5515919 B2 | 6/2014 |

(Continued)

OTHER PUBLICATIONS

International Search Report issued in International Application No. PCT/KR2021/003863 dated Jul. 21, 2021.

(Continued)

*Primary Examiner* — Lihong Yu

(74) *Attorney, Agent, or Firm* — STAAS & HALSEY LLP

(57) ABSTRACT

A sink device comprising a connector which has a first ground (GND) corresponding to a first standard; and a processor which receives a signal from a source device, via the connector, and if the received signal is of a second standard corresponding to a second GND that includes the first GND, requests, from the source device, information about the signal of the second standard.

13 Claims, 10 Drawing Sheets

(56)                   References Cited

U.S. PATENT DOCUMENTS

| | | | |
|---|---|---|---|
| 2008/0055464 A1* | 3/2008 | Shin | H04N 21/43635 |
| | | | 348/E7.004 |
| 2009/0231265 A1* | 9/2009 | Tsukio | G09G 3/3611 |
| | | | 345/104 |
| 2014/0084986 A1* | 3/2014 | Hoogendoorn | G09G 5/006 |
| | | | 327/333 |
| 2015/0208026 A1 | 7/2015 | Lai et al. | |
| 2017/0006336 A1* | 1/2017 | Lee | H04N 21/434 |
| 2019/0068918 A1 | 2/2019 | Cornelius et al. | |
| 2019/0230196 A1 | 7/2019 | Huang et al. | |
| 2019/0280850 A1* | 9/2019 | Tan | H04L 7/042 |
| 2020/0029121 A1* | 1/2020 | Zhang | G06F 5/14 |
| 2020/0381417 A1* | 12/2020 | Salcedo | H01L 29/0834 |
| 2021/0328720 A1* | 10/2021 | Jeng | H04L 1/0091 |

FOREIGN PATENT DOCUMENTS

| | | |
|---|---|---|
| JP | 2019-45655 A | 3/2019 |
| JP | 6655799 B2 | 2/2020 |
| KR | 10-2012-0099881 A | 9/2012 |
| KR | 10-2012-0130121 A | 11/2012 |
| KR | 10-1303945 B1 | 9/2013 |
| KR | 10-2014-0119781 A | 10/2014 |
| KR | 10-2020-0029854 A | 3/2020 |
| KR | 10-2070676 B1 | 4/2020 |

OTHER PUBLICATIONS

International Written Opinion issued in International Application No. PCT/KR2021/003863 dated Jul. 21, 2021.
Office Action dated Jun. 5, 2025 issued in Korean Application No. 10-2020-0078778.

* cited by examiner

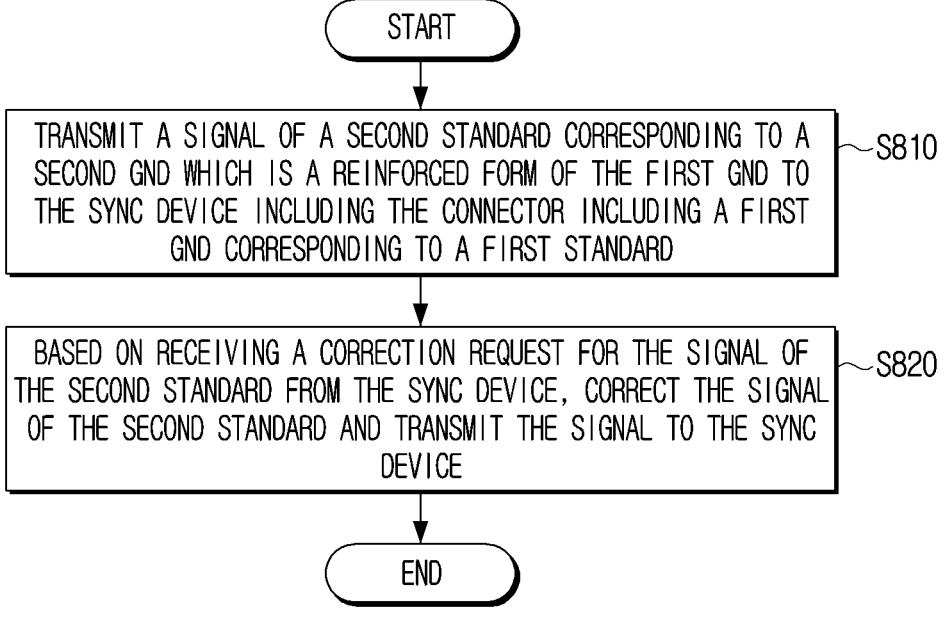

START

TRANSMIT A SIGNAL OF A SECOND STANDARD CORRESPONDING TO A SECOND GND WHICH IS A REINFORCED FORM OF THE FIRST GND TO THE SYNC DEVICE INCLUDING THE CONNECTOR INCLUDING A FIRST GND CORRESPONDING TO A FIRST STANDARD — S810

BASED ON RECEIVING A CORRECTION REQUEST FOR THE SIGNAL OF THE SECOND STANDARD FROM THE SYNC DEVICE, CORRECT THE SIGNAL OF THE SECOND STANDARD AND TRANSMIT THE SIGNAL TO THE SYNC DEVICE — S820

END

SINK DEVICE, SOURCE DEVICE, AND CONTROL METHODS FOR SAME

CROSS-REFERENCE TO RELATED APPLICATION

This application is a continuation application, under 35 U.S.C. § 111 (a), of international application No. PCT/KR2021/003863, filed on Mar. 29, 2021, which claims priority under 35 U. S. C. § 119 to Korean Patent Application No. 10-2020-0078778, filed on Jun. 26, 2020, the disclosures of which are incorporated herein by reference in their entirety.

BACKGROUND

Field

The disclosure relates to a sink device, a source device, and a control method for the same, and more particularly, to a sink device that transmits and receives signals, a source device, and a control method for the same.

Description of the Related Art

Recently, as image processing technologies and display devices have been developed, standards through which a content of a high resolution can be transmitted in real time are being developed. However, compatibility between the newly developed standards and the previous standards could become a problem.

For example, in the conventional high-definition multimedia interface (HDMI) 2.0 standard, a clock of a high frequency was included, and thus there was possibility that an electro magnetic interference (EMI) problem could occur. EMI means a problem that malfunction occurs due to a noise generated in an electronic device, and in particular, there is high possibility that the problem could occur from a clock of a high frequency.

In the conventional HDMI 2.0 standard, for preventing the EMI problem, a method of reinforcing a ground (GND) of an HDMI connector was used.

In contrast, in the recent HDMI 2.0 standard, super high-speed communication is supported by reducing a GND numerical value of an HDMI connector, but in case data communication of the HDMI 2.0 standard was performed by using an HDMI 2.1 connector, the EMI problem occurred.

That is, in case data communication of the HDMI 2.0 standard is performed, a clock of a high frequency is transmitted, but there is a problem that the EMI problem cannot be prevented with an HDMI connector of the HDMI 2.1 standard of which GND numeral value has been reduced.

SUMMARY

According to an embodiment of the disclosure, a sink device includes a connector including a first ground (GND) corresponding to a first standard, and a processor configured to receive a signal from a source device through the connector, and based on the received signal being of a second standard corresponding to a second GND, which is a reinforced form of the first GND, request a correction for the received signal of the second standard to the source device.

Also, the processor may request scramble or spread spectrum clocking (SSC) for the received signal of the second standard.

In addition, the processor may, based on at least one of whether the received signal includes a clock signal or a resolution of the received signal, identify whether the received signal is of the second standard.

Further, in the second GND, at least one of the number of ground points or the areas of the ground points are bigger than those of the first GND.

Also, the first standard may be of a version after the second standard.

In addition, the first GND may correspond to a standard of high-definition multimedia interface (HDMI) 2.1, and the second GND may correspond to a standard of HDMI 2.0.

According to an embodiment of the disclosure for achieving the aforementioned purpose, a source device includes a communication interface connectable to a connector including a first GND corresponding to a first standard, and a processor configured to control the communication interface while the communication interface is connected to the connector to transmit a signal of a second standard corresponding to a second GND which is a reinforced form of the first GND, and based on receiving a correction request for the signal of the second standard through the communication interface, correct the signal of the second standard and control the communication interface to transmit the signal to a sink device which includes the connector.

Also, the processor may, based on the receiving of the correction request for the signal of the second standard, perform scramble or spread spectrum clocking (SSC) processing of the signal of the second standard and control the communication interface to transmit the signal to the sink device.

In addition, the processor may, based on receiving extended display identification data (EDID) information of the sink device from the sink device, identify a standard of the connector included in the sink device based on the EDID information, and based on identifying that the standard of the connector corresponds to the first standard, correct the signal of the second standard and control the communication interface to transmit the signal to the sink device.

Further, in the second GND, the number of ground points or the areas of the ground points are bigger than those of the first GND.

Also, the first standard may be of a version after the second standard.

In addition, the first GND may correspond to a standard of HDMI 2.1, and the second GND may correspond to a standard of HDMI 2.0.

Meanwhile, according to an embodiment of the disclosure, a control method for a sink device includes receiving a signal from a source device through a connector including a first ground (GND) corresponding to a first standard, and based on the received signal being of a second standard corresponding to a second GND, which is a reinforced form of the first GND, requesting a correction for the received signal of the second standard to the source device.

Also, in the requesting of the correction, scramble or spread spectrum clocking (SSC) for the signal of the second standard may be requested.

In addition, in the requesting of the correction, based on at least one of whether the received signal includes a clock signal or a resolution of the received signal, it may be identified whether the received signal is the signal of the second standard.

Further, in the second GND, at least one of a number of ground points or areas of the number of ground points may be greater than at least one of a number of ground points or areas of the number of ground points the first GND.

Also, the first standard may be of version after the second standard.

In addition, the first GND may correspond to a standard of high-definition multimedia interface (HDMI) 2.1, and the second GND may correspond to a standard of HDMI 2.0.

Meanwhile, according to an embodiment of the disclosure, a control method for a sink device includes transmitting a signal of a second standard corresponding to a second GND which is a reinforced form of the first GND to a sink device including a connector which includes the first GND corresponding to a first standard, and based on receiving a correction request for the received signal of the second standard from the sink device, correcting the signal of the second standard and transmitting the corrected signal to the sink device.

Also, in transmitting the corrected signal of the second standard, based on receiving the correction request for the signal of the second standard, scramble or spread spectrum clocking (SSC) processing of the signal of the second standard may be performed and the signal may be transmitted to the sink device.

In addition, the control method may further include, based on receiving extended display identification data (EDID) information of the sink device from the sink device, identifying the standard of the connector included in the sink device based on the EDID information, and transmitting the corrected signal of the second standard, based on identifying that the standard of the connector corresponds to the first standard, the signal of the second standard may be corrected and the communication interface may be controlled to transmit the signal to the sink device.

Further, in the second GND, at least one of a number of ground points or areas of the number of ground points may be greater than at least one of a number of ground points or areas of the number of ground points of the first GND.

Also, the first standard may be of a version after the second standard.

In addition, the first GND may correspond to a standard of high-definition multimedia interface (HDMI) 2.1, and the second GND may correspond to a standard of HDMI 2.0.

BRIEF DESCRIPTION OF THE DRAWINGS

The above and other aspects, features, and advantages of certain embodiments of the present disclosure will be more apparent from the following description taken in conjunction with the accompanying drawings, in which.

4

Figure 1:
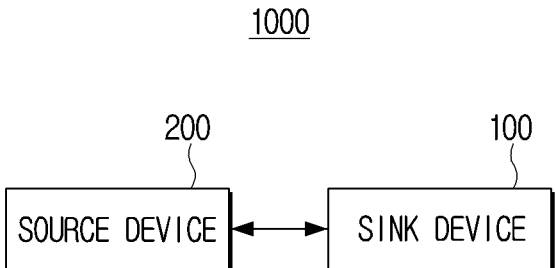
FIG. 1 is a diagram illustrating an electronic system according to an embodiment of the disclosure.

FIG. 8 is a flow chart for illustrating an operation of a source device according to an embodiment of the disclosure.

DETAILED DESCRIPTION

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

Also, singular expressions include plural expressions, unless defined obviously differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in this specification, the term "user" may refer to a person who uses an electronic device or a device using an electronic device (e.g.: an artificial intelligence electronic device).

The disclosure is for addressing the aforementioned need, and the purpose of the disclosure is in providing a sink device and a source device for resolving the electro magnetic interference (EMI) problem that occurs in a transmission process of a signal, and a control method for the same.

According to the various embodiments of the disclosure as described above, a syn device, based on identifying that a signal received from a source device is a predetermined signal, requests correction of the signal to the source device, and the source device corrects the signal based on the request from the sink device, and provides the corrected signal to the sink device. Accordingly, the electro magnetic interference (EMI) problem can be resolved.

Hereinafter, various embodiments of the disclosure will be described in more detail with reference to the accompanying drawings.

FIG. 1 is a diagram illustrating an electronic system 1000 according to an embodiment of the disclosure. As illustrated in FIG. 1, the electronic system 1000 includes a sink device 100 and a source device 200.

The sink device 100 is a device receiving a signal from the source device 200, and it may be a device that includes a display such as a TV, a desktop PC, a laptop computer, a video wall, a large format display (LFD), digital signage, a digital information display (DID), a projector display, a digital video disk (DVD) player, a smartphone, a tablet PC, a monitor, smart glasses, a smart watch, etc., and directly displays a content corresponding to a received signal.

Alternatively, the sink device 100 may be a device that does not include a display such as a set-top box (STB), a computer main body, etc., and receives a signal from the source device 200, and then provides a content corresponding to the received signal to a display device.

However, the device is not limited thereto, and the sink device 100 can be any device that receives a signal from the source device 200.

If a signal received from the source device 200 is a signal of a predetermined standard, the sink device 100 may request correction of the signal to the source device 200.

The source device 200 is a device that transmits a signal to the sink device 100, and it may be a device that does not include a display such as a set-top box (STB), a computer main body, etc.

Alternatively, the source device 200 may be a device that includes a display such as a TV, a desktop PC, a laptop computer, a video wall, a large format display (LFD), digital signage, a digital information display (DID), a projector display, a digital video disk (DVD) player, a smartphone, a tablet PC, a monitor, smart glasses, a smart watch, etc., and directly displays a content, and at the same time, transmits a signal corresponding to the content to the sink device 100.

If a request for correcting a signal is received from the sink device 100, the source device 200 may correct the signal, and provide the corrected signal to the sink device 100. Here, the source device 200 may correct the signal such that the electro magnetic interference (EMI) problem can be prevented.

That is, if there is a possibility that the EMI problem could occur by the received signal, the sink device 100 may request correction for preventing this to the source device 200, and the source device 200 may resolve the EMI problem by correcting the signal based on the correction request of the sink device 100.

Hereinafter, a detailed method of resolving the EMI problem will be described, and first, it will be assumed that the sink device 100 and the source device 200 perform communication by a high-definition multimedia interface (HDMI) standard.

Figure 2:
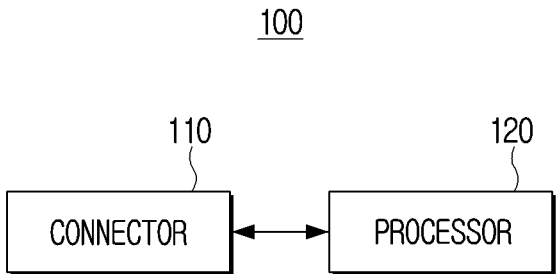
FIG. 2 is a block diagram for illustrating a hardware configuration of a sink device according to an embodiment of the disclosure.

FIG. 2 is a block diagram for illustrating a hardware configuration of the sink device 100 according to an embodiment of the disclosure.

According to FIG. 2, the sink device 100 includes a connector 110 and a processor 120. However, the disclosure is not limited thereto, and the sink device 100 may be implemented in a form wherein some components are excluded.

The connector 110 is a component for receiving a signal from the source device 200, and it may include a first ground (GND) corresponding to a first standard. For example, the connector 110 may be a standard of HDMI 2.1, and may include a first GND corresponding to the standard of HDMI 2.1.

The sink device 100 may receive a content of an 8K resolution at the maximum from the source device 200 through communication of an HDMI 2.1 standard. Such transmission of a content of a high resolution can be performed as the HDMI 2.1 standard supports super high-speed communication by reducing the GND numerical value. Specifically, the HDMI 2.1 standard reduced the GND numerical value as the number of ground points are smaller or by reducing the areas of the ground points than those of the standard of the previous version, and by virtue of this, super high-speed communication is possible.

The processor 120 controls the overall operations of the sink device 100. Specifically, the processor 120 may be connected to each component of the sink device 100, and control the overall operations of the sink device 100. For example, the processor 120 may be connected to the connector 110, and control the operations of the sink device 100.

According to an embodiment, the processor 120 may be implemented as a digital signal processor (DSP), a microprocessor, and a time controller (TCON). However, the disclosure is not limited thereto, and the processor 120 may include one or more of a central processing unit (CPU), a micro controller unit (MCU), a micro processing unit (MPU), a controller, an application processor (AP), or a communication processor (CP), and an ARM processor, or may be defined by the terms. Also, the processor 120 may be implemented as a system on chip (SoC) having a processing algorithm stored therein or large scale integration (LSI), or in the form of a field programmable gate array (FPGA).

The processor 120 may receive a signal from the source device 200 through the connector 110, and identify whether the received signal is a signal of a second standard corresponding to a second GND which is a reinforced form of the first GND.

Specifically, the processor 120 may identify whether the received signal is a signal of the second standard based on at least one of whether the received signal includes a clock signal or the resolution of the received signal. For example, in case the received signal includes a clock signal or the resolution of the received signal is smaller than or equal to Ultra-HD (UHD), the processor 120 may identify that the received signal is a signal of the second standard. Here, the second standard is a standard of HDMI 2.0, and the standard of HDMI 2.0 requests the second GND. That is, the first standard may be a standard corresponding to a version after the second standard. Also, in the second GND, at least one of the number of ground points or the areas of the ground points may be bigger than those of the first GND. That is, the second GND may be in a state wherein the GND numerical value has been reinformed more than the first GND.

If the received signal is a signal of the second standard corresponding to the second GND which is a reinforced form of the first GND, the processor 120 may request correction for the signal of the second standard to the source device 200. Such an operation is performed because the version of the connector 110 of the sink device 100 and the version of the received signal are different. That is, the received signal is a signal of a version requesting the second GND, and the EMI problem should be resolved by the second GND. However, the connector 110 of the sink device 100 is in a state of including the first GND, and in the first GND, the GND numerical value becomes lower than that of the second GND, and thus the EMI problem cannot be resolved.

Accordingly, if the received signal is a signal of the second standard corresponding to the second GND, the processor 120 may request scramble or spread spectrum clocking (SSC) for the signal of the second standard. That is, the processor 120 may induce such that the source device 200 transmits a signal wherein the EMI problem has been resolved on its own. Scramble is a method of disturbing a signal through frequency manipulation, and SSC is a method of dispersing an energy spectrum of a clock signal, and both of them can be used as a method of resolving the EMI problem.

The sink device 100 can resolve the EMI problem by requesting correction of a signal to the source device 200 through an operation as described above.

Meanwhile, the sink device 100 may further include a display (not shown). The display may be implemented as displays in various forms such as a liquid crystal display (LCD), an organic light emitting diodes (OLED) display, a plasma display panel (PDP), etc. Inside the display, a driving circuit that may be implemented in forms such as an a-si TFT, a low temperature poly silicon (LTPS) TFT, and an organic TFT (OTFT), etc., a backlight unit, and the like may also be included together. Meanwhile, the display may be implemented as a touch screen combined with a touch sensor, a flexible display, a 3D display, etc.

The processor 120 may receive a corrected signal, and display the signal through the display 160.

Figure 3:
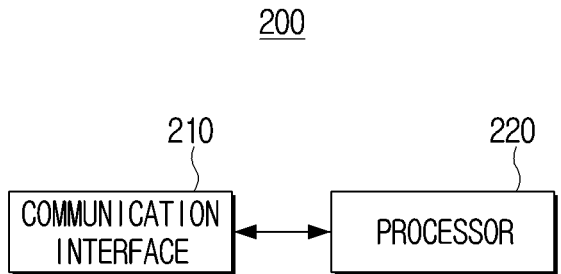
FIG. 3 is a block diagram for illustrating a hardware configuration of a source device according to an embodiment of the disclosure.

FIG. 3 is a block diagram for illustrating a hardware configuration of the source device 200 according to an embodiment of the disclosure.

According to FIG. 3, the source device 200 includes a communication interface 210) and a processor 220. However, the disclosure is not limited thereto, and the source device 200 may be implemented in a form wherein some components are excluded.

The communication interface 210 is a component for performing communication with various devices. For example, the communication interface 210 may support various wired communication methods such as HDMI, MHL, USB, RGB, D-SUB, DVI, etc. Also, the communication interface 210) may support various wireless communication methods such as BlueTooth (BT), Bluetooth Low Energy (BLE), Wireless Fidelity (WI-FI), Zigbee, etc. However, the disclosure is not limited thereto, and the communication interface 210 can be any device if it is of a communication standard that can communicate with an external device.

The communication interface 210 may be connected to the connector 110 including the first GND corresponding to the first standard. Here, the connector 110 may be of a standard of HDMI 2.1, and may include the first GND corresponding to the standard of HDMI 2.1.

The processor 220 controls the overall operations of the source device 200. Specifically, the processor 220 may be connected to each component of the source device 200, and control the overall operations of the source device 200. For example, the processor 220 may be connected to the communication interface 210, and control the operations of the source device 200.

According to an embodiment, the processor 220 may be implemented as a digital signal processor (DSP), a microprocessor, and a time controller (TCON). However, the disclosure is not limited thereto, and the processor 220 may include one or more of a central processing unit (CPU), a micro controller unit (MCU), a micro processing unit (MPU), a controller, an application processor (AP), or a communication processor (CP), and an ARM processor, or may be defined by the terms. Also, the processor 220 may be implemented as a system on chip (SoC) having a processing algorithm stored therein or large scale integration (LSI), or in the form of a field programmable gate array (FPGA).

The processor 220 may control the communication interface 210 to transmit a signal of the second standard corresponding to the second GND which is a reinforced form of the first GND. Here, the second standard is a standard of HDMI 2.0, and the standard of HDMI 2.0 requests the second GND. That is, the first standard may be a standard corresponding to a version after the second standard. Also, in the second GND, at least one of the number of ground points or the areas of the ground points may be bigger than those of the first GND. That is, the second GND may be in a state wherein the GND numerical value has been reinformed more than the first GND.

In case the processor 220 transmits an initial signal, the processor 220 gets to transmit a signal of the second standard. This is because the connector 110 of the sink device 100 may be of the second standard. In case the connector 110 of the sink device 100 is of the second standard, the EMI problem would not occur through the second GND wherein the GND numerical value has been reinforced.

In contrast, in case the connector 110 of the sink device 100 is of the first standard, the sink device 100 gets to request correction of a signal to the source device 200, as described in FIG. 2. If a correction request for a signal of the second standard is received through the communication interface 210, the processor 220 may correct the signal of the second standard, and control the communication interface 210 to transmit the signal to the sink device 100 including the connector 110.

For example, if a correction request for a signal of the second standard is received, the processor 220 may perform scramble or spread spectrum clocking (SSC) processing of the signal of the second standard, and control the communication interface 210 to transmit the signal to the sink device 100.

However, the disclosure is not limited thereto, and the processor 220 may resolve the EMI problem more actively. For example, if extended display identification data (EDID) information of the sink device 100 is received from the sink device 100, the processor 220 may identify the standard of the connector 110 included in the sink device 100 based on the EDID information, and if it is identified that the standard of the connector 110 corresponds to the first standard, the processor 220 may correct the signal of the second standard and control the communication interface 210 to transmit the signal to the sink device 100.

As described above, the processor 220 may correct a signal based on a correction request received from the sink device 100, and transmit the corrected signal to the sink device 100, and accordingly, the EMI problem can be resolved.

Figure 4:
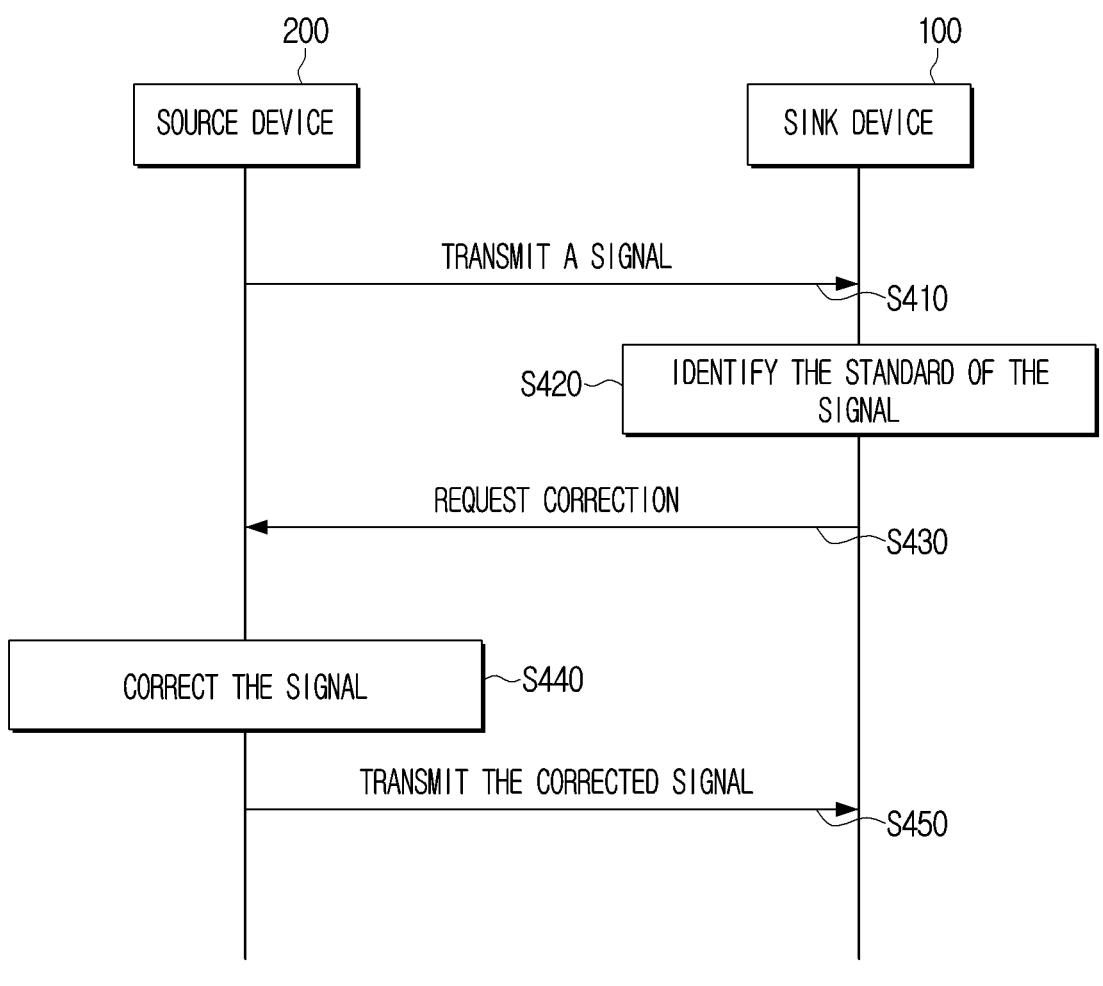
FIG. 4 is a sequence diagram for illustrating an operation of an electronic system according to an embodiment of the disclosure.

FIG. 4 is a sequence diagram for illustrating an operation of the electronic system 1000 according to an embodiment of the disclosure.

First, the source device 200 may transmit a signal to the sink device 100 in operation S410. Here, the signal transmitted by the source device 200 may be a signal corresponding to a standard of HDMI 2.0, and it may include a clock signal.

The sink device 100 may identify the standard of the received signal in operation S420. For example, in case the received signal includes a clock signal, the sink device 100 may identify the received signal as a signal corresponding to the standard of HDMI 2.0, and in case the received signal does not include a clock signal, the sink device 100 may identify the received signal as a signal corresponding to a standard of HDMI 2.1.

Alternatively, in case the received signal is a signal of an UHD resolution, the sink device 100 may identify the received signal as a signal corresponding to the standard of HDMI 2.0, and in case the received signal is a signal of an 8K resolution, the sink device 100 may identify the received signal as a signal corresponding to the standard of HDMI 2.1.

Such an identifying operation may be based on the standard of the connector 110 of the sink device 100. For example, in case the sink device 100 includes the connector 110 of the standard of HDMI 2.1, the sink device 100 may identify the standard of the received signal, and in case the sink device 100 includes the connector 110 of the standard of HDMI 2.0, the sink device 100 may not identify the standard of the received signal. Hereinafter, it will be described that the sink device 100 includes the connector 110 of the standard of HDMI 2.1, for the convenience of explanation.

If the received signal is identified as a signal corresponding to the standard of HDMI 2.0, the sink device 100 may request correction for the signal to the source device 200 in operation S430, and if the received signal is identified as a signal corresponding to the standard of HDMI 2.1, the sink device 100 may not perform any operation.

The source device 200 may correct the signal according to a correction request of the sink device 100 in operation S440. For example, the source device 200 may perform scramble or SSC for the signal. However, the disclosure is not limited thereto, and the correction can be any correction if it is a correction that can resolve the EMI problem from the signal. For example, the source device 200 may perform adjustment of the clock timing for the signal.

Then, the source device 200 may transmit the corrected signal to the sink device 100 in operation S450.

Figure 5A:
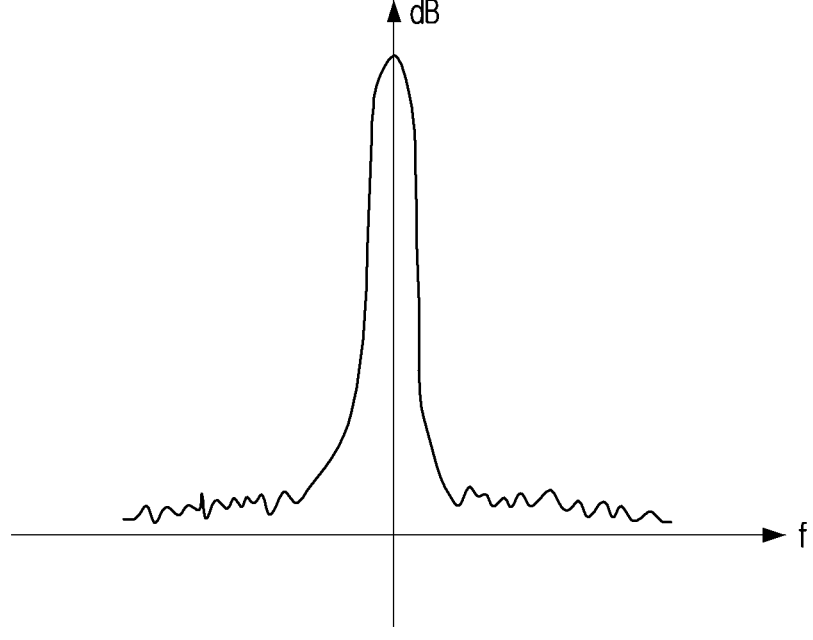
FIG. 5A and FIG. 5B are diagrams for illustrating a correction method according to an embodiment of the disclosure.
Figure 5B:
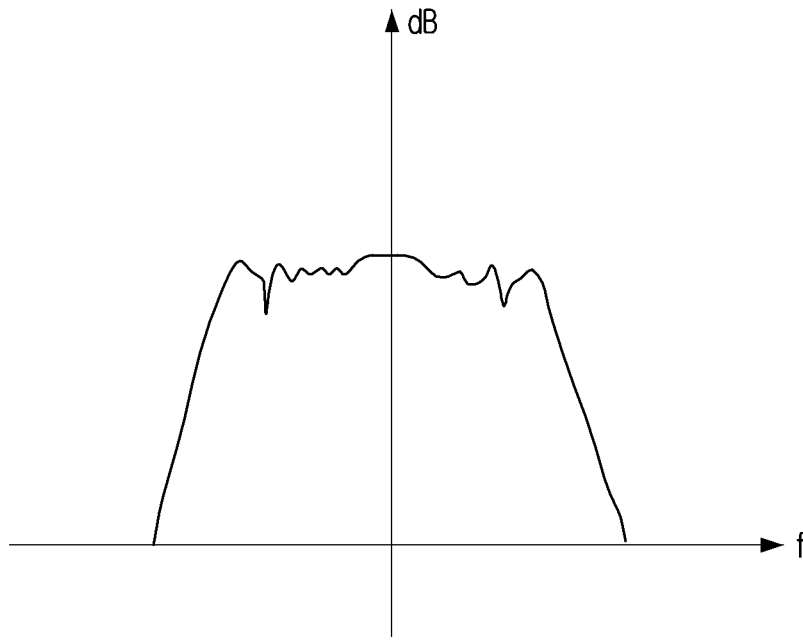

FIG. 5A and FIG. 5B are diagrams for illustrating a correction method according to an embodiment of the disclosure.

A signal that drastically changes in a short time as in FIG. 5A may generate the EMI problem due to a high frequency.

Accordingly, the source device 200 may perform SSC processing of the signal in FIG. 5A, and convert the signal to a form as in FIG. 5B. The signal in FIG. 5B may weaken the high frequency component more than the signal in FIG. 5A, and can thereby resolve the EMI problem.

By the method as described above, the source device 200 obtains a corrected signal that can resolve the EMI problem, and gets to transmit the corrected signal to the sink device 100.

Even through the sink device 100 includes the connector 110 of which GND numerical value is low, the high frequency component of the received signal itself is weakened, and thus the EMI problem does not occur.

Figure 6A:
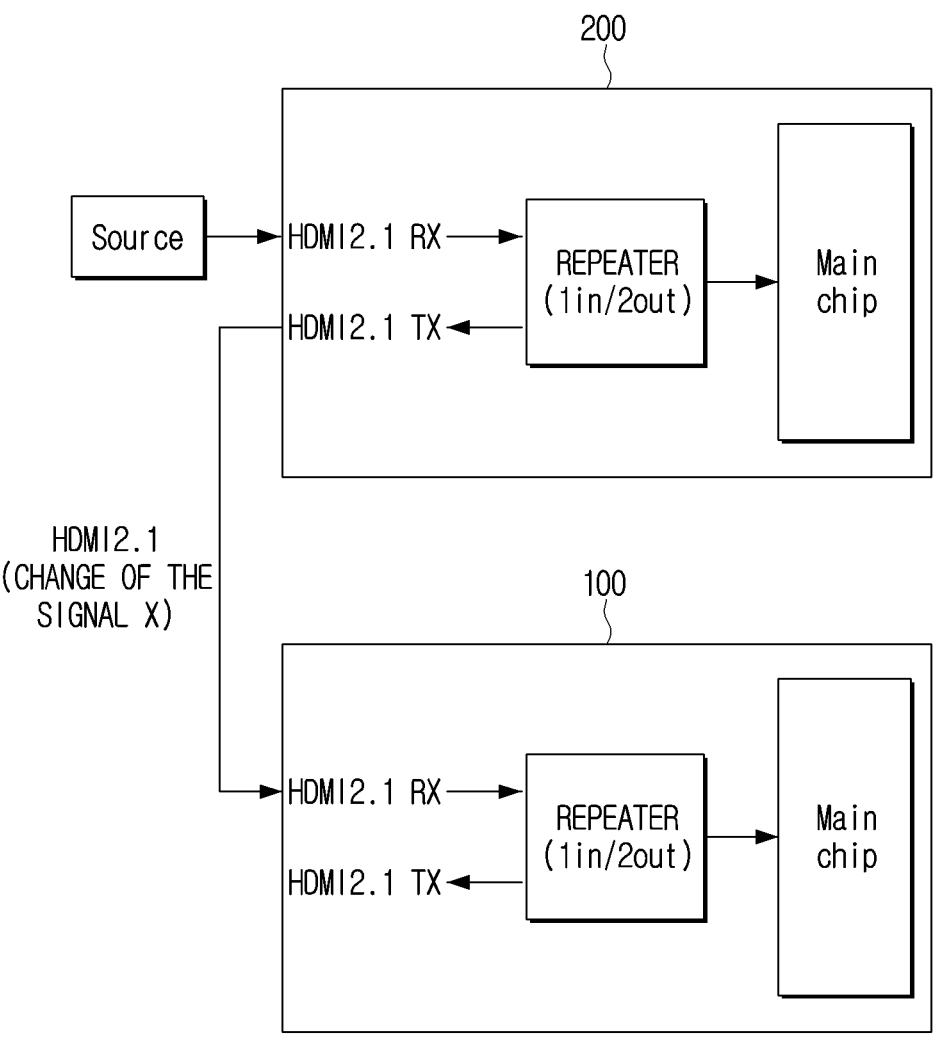
FIG. 6A and FIG. 6B are diagrams for illustrating a correction requesting operation and an operation of a repeater according to another embodiment of the disclosure.
Figure 6B:
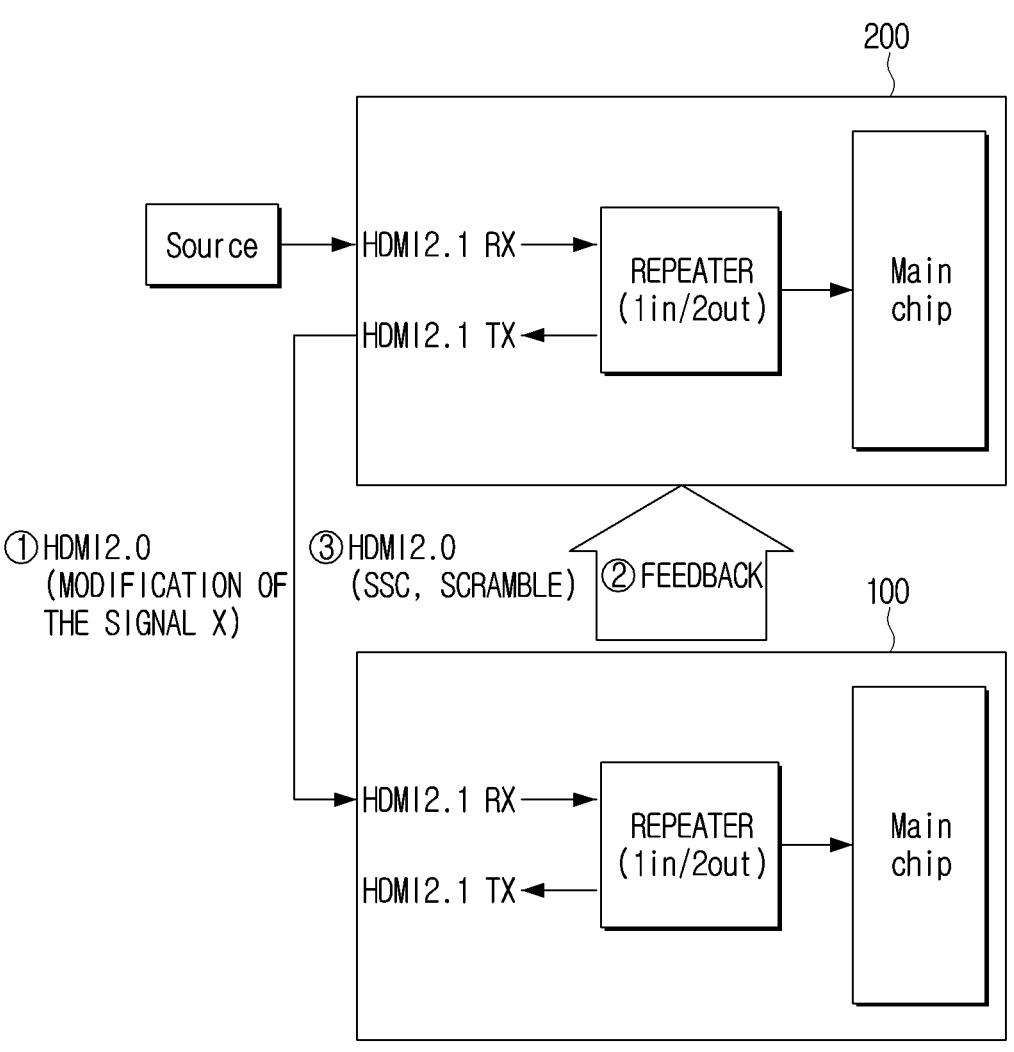

FIG. 6A and FIG. 6B are diagrams for illustrating a correction requesting operation and an operation of a repeater according to another embodiment of the disclosure.

In FIG. 6A and FIG. 6B, it was assumed that the source device 200 is a display device including a display. Also, it was assumed that the source device 200 receives a signal from a separate device, and includes a repeater for transmitting the received signal to the sink device 100. That is, it was assumed that the source device 200 in FIG. 6A and FIG. 6B operates as a sink device, and operates as a source device at the same time. Also, it was assumed that the sink device 100 receives a signal from the source device 200, and includes a repeater for transmitting the received signal to another sink device (not shown). That is, it was assumed that the sink device 100 in FIG. 6A and FIG. 6B operates as a sink device, and operates as a source device at the same time.

As illustrated in FIG. 6A, the HDMI 2.1 TX PORT of the source device 200 may be loop-out connected with the HDMI 2.1 RX PORT of the sink device 100. If a signal of the HDMI 2.1 standard is received through the HDMI 2.1 RX PORT, the sink device 100 may display the signal as it is, and provide the received signal to another sink device (not shown) connected to the sink device 100 through the HDMI 2.1 TX PORT. That is, for a signal transmitted and received between devices, separate correction is not performed.

In contrast, as illustrated in FIG. 6B, the HDMI 2.1 TX PORT of the source device 200 may be loop-out connected with the HDMI 2.1 RX PORT of the sink device 100, and if a signal of the HDMI 2.0 standard is received through the HDMI 2.1 RX PORT, the sink device 100 may provide a feedback in this regard to the source device 200. Here, the received signal may be in a state wherein separate correction was not performed, and the sink device 100 may request correction for the signal to the source device 200 through the feedback.

The source device 200 may correct the signal based on the feedback. For example, the source device 200 may perform scramble or SSC processing of the signal, and transmit the signal to the sink device 100.

Through such an operation, the EMI problem that could occur in the sink device 100 can be resolved.

Meanwhile, the loop-out connection may be performed through a plurality of sink devices 100, and in this case, the sink devices 100 may identify whether the received signal went through scramble or SSC processing. That is, only in case the received signal did not go thorough scramble or SSC processing, the sink devices 100 may transmit a correction request to the device that provided the signal (the source device 200 or the previous sink device). In contrast, in case the received signal went through scramble or SSC processing, the sink devices 100 may not transmit a correction request to the device that provided the signal (the source device 200 or the previous sink device).

Figure 7:
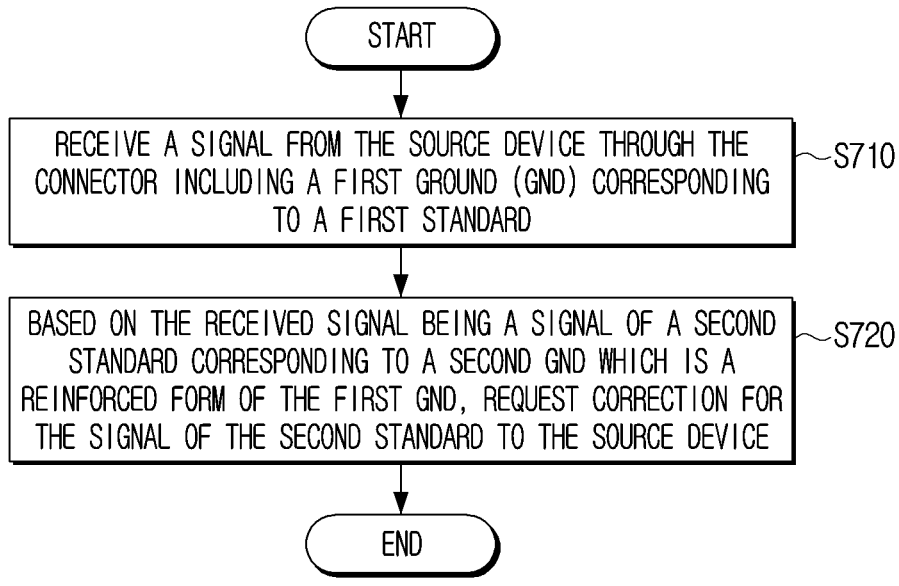
FIG. 7 is a flow chart for illustrating an operation of a sink device according to an embodiment of the disclosure.

FIG. 7 is a flow chart for illustrating an operation of the sink device 100 according to an embodiment of the disclosure.

First, through the connector including a first ground (GND) corresponding to a first standard, a signal is received from the source device in operation S710. Then, if the received signal is a signal of a second standard corresponding to a second GND which is a reinforced form of the first GND, correction for the signal of the second standard is requested to the source device in operation S720.

Here, in the requesting operation S720, scramble or spread spectrum clocking (SSC) for the signal of the second standard may be requested.

Also, in the requesting operation S720, it may be identified whether the received signal is a signal of the second standard based on at least one of whether the received signal includes a clock signal or the resolution of the received signal.

Meanwhile, in the second GND, at least one of the number of ground points or the areas of the ground points may be bigger than those of the first GND.

Also, the first standard may be a standard corresponding to a version after the second standard.

In addition, the first GND may correspond to a standard of HDMI 2.1, and the second GND may correspond to a standard of HDMI 2.0.

FIG. 8 is a flow chart for illustrating an operation of the source device 200 according to an embodiment of the disclosure.

First, a signal of a second standard corresponding to a second GND which is a reinforced form of the first GND is transmitted to the sink device including the connector including the first GND corresponding to the first standard in operation S810. Then, if a correction request for the signal of the second standard is received from the sink device, the signal of the second standard is corrected, and is transmitted to the sink device in operation S820.

Here, in the operation S820 of transmitting the corrected signal of the second standard, if a correction request for the signal of the second standard is received, scramble or spread spectrum clocking (SSC) processing of the signal of the second standard may be performed, and the signal may be transmitted to the sink device.

Alternatively, an operation of, based on receiving extended display identification data (EDID) information of the sink device from the sink device, identifying the standard of the connector included in the sink device based on the EDID information may be further included, and in the operation S820 of transmitting the corrected signal of the second standard, if it is identified that the standard of the connector corresponds to the first standard, the signal of the second standard may be corrected, and may be transmitted to the sink device.

Meanwhile, in the second GND, at least one of the number of ground points or the areas of the ground points may be bigger than those of the first GND.

Also, the first standard may be a standard corresponding to a version after the second standard.

In addition, the first GND may correspond to a standard of HDMI 2.1, and the second GND may correspond to a standard of HDMI 2.0.

According to the various embodiments of the disclosure as described above, a syn device, based on identifying that a signal received from a source device is a predetermined signal, requests correction of the signal to the source device, and the source device corrects the signal based on the request from the sink device, and provides the corrected signal to the sink device. Accordingly, the electro magnetic interference (EMI) problem can be resolved.

Meanwhile, in the above, it was described that the connector and a transmitted signal are of an HDMI standard, but the disclosure is not limited thereto. For example, for any cases wherein the EMI problem could occur such as a case wherein a clock signal is omitted or a case wherein the GND numerical value varies according to the difference in the version, etc., the disclosure can be applied.

Meanwhile, according to an embodiment of the disclosure, the aforementioned various embodiments may be implemented as software including instructions stored in machine-readable storage media, which can be read by machines (e.g.: computers). The machines refer to devices that call instructions stored in a storage medium, and can operate according to the called instructions, and the devices may include an electronic device according to the aforementioned embodiments (e.g.: an electronic device A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, a method according to the aforementioned various embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

Further, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A sink device comprising:
a connector connectable to an external source device, the connector corresponding to a first standard of high-definition multimedia interface (HDMI), the first standard being HDMI 2.1; and
a processor configured to:
receive a signal to be transmitted from the external source device through the connector while the connector is connected to the external source device;
identify whether the received signal is of a second standard of HDMI, the second standard being HDMI 2.0;
in response to the identifying that the received signal is of the second standard of HDMI, request for a correction of the signal transmitting from the external source device which is identified as the second standard of HDMI to the external source device to resolve electromagnetic interference (EMI) problem;
to receive the signal that has been corrected from the external source device; and
to provide a content corresponding to the received signal that has been corrected.

2. The sink device of claim 1, wherein the processor is further configured to request, to the external source device, the correction for the signal of the second standard of HDMI by requesting scramble or spread spectrum clocking (SSC) for the signal of the second standard of HDMI.

3. The sink device of claim 1, wherein the processor is further configured to identify that the received signal is of the first standard of HDMI by identifying that the received signal includes a clock signal and identify that the received signal is of the second standard of HDMI by identifying that the received signal includes a resolution information.

4. The sink device of claim 1, wherein the connector includes a first ground (GND) and the second standard of HDMI corresponds to a second GND which is a reinforced form of the first GND, and wherein, in the second GND, at least one of a number of ground points or areas of the ground points are bigger than those of the first GND.

5. The sink device of claim 1,
wherein the first standard of HDMI is of a later version than a version of the second standard of HDMI.

6. A source device comprising:
a communication interface connectable to a connector of an external sink device, the connector corresponding to a first standard of HDMI, the first standard being HDMI 2.1; and
a processor configured to:
    control the communication interface, while the source device is connected to the connector of the external sink device through the communication interface, to transmit a signal of a second standard of HDMI, the second standard being HDMI 2.0;
    in response to receiving a correction request for the signal of the second standard of HDMI to resolve EMI problem through the communication interface, correct the signal of the second standard of HDMI based on the correction request; and
    control the communication interface to transmit the signal that has been corrected to the connector of the external sink device.

7. The source device of claim 6,
wherein the processor is further configured to:
    in response to the receiving of the correction request for the signal of the second standard of HDMI, perform scramble or spread spectrum clocking (SSC) processing of the signal of the second standard of HDMI; and
    control the communication interface to transmit the performed signal to the external sink device.

8. The source device of claim 6,
wherein the processor is further configured to:
    in response to receiving extended display identification data (EDID) information of the external sink device from the external sink device, identify a standard of the connector included in the external sink device based on the EDID information, and
    in response to the identifying that the standard of the connector of the external sink device corresponds to the first standard of HDMI, correct the signal of the second standard of HDMI; and
    control the communication interface to transmit the corrected signal to the external sink device.

9. The source device of claim 6,
wherein the connector includes a first ground (GND) and the second standard of HDMI corresponds to a second GND which is a reinforced form of the first GND, and wherein, in the second GND, a number of ground points or areas of the ground points are bigger than those of the first GND.

10. The source device of claim 6,
wherein the first standard of HDMI is of a later version than a version of the second standard of HDMI.

11. A control method for a sink device having a connector connectable to an external source device, and a processor, the method comprising:
receiving a signal to be transmitted from the external source device through the connector corresponding to a first standard of HDMI, the first standard being HDMI 2.1, while the connector is connected to the external source device;
identifying, by the processor, whether the received signal is of a second standard of HDMI, the second standard being HDMI 2.0;
in response to the identifying that the received signal is of the second standard of HDMI, requesting for a correction of the signal transmitting from the external source device which is identified as the second standard of HDMI to the external source device;
receiving the signal that has been corrected from the external source device; and
providing a content corresponding to the received signal that has been corrected.

12. The control method of claim 11,
wherein the requesting comprises:
requesting scramble or spread spectrum clocking (SSC) for the signal of the second standard of HDMI.

13. The control method of claim 11,
wherein the requesting comprises:
identifying that the signal is of the second standard of HDMI by identifying that the received signal includes at least one of a clock signal and a resolution information.

* * * * *